Nov. 2, 1943.                J. JANDASEK                 2,333,253
                           TURBO TRANSMISSION
                        Filed Feb. 7, 1940            2 Sheets-Sheet 1
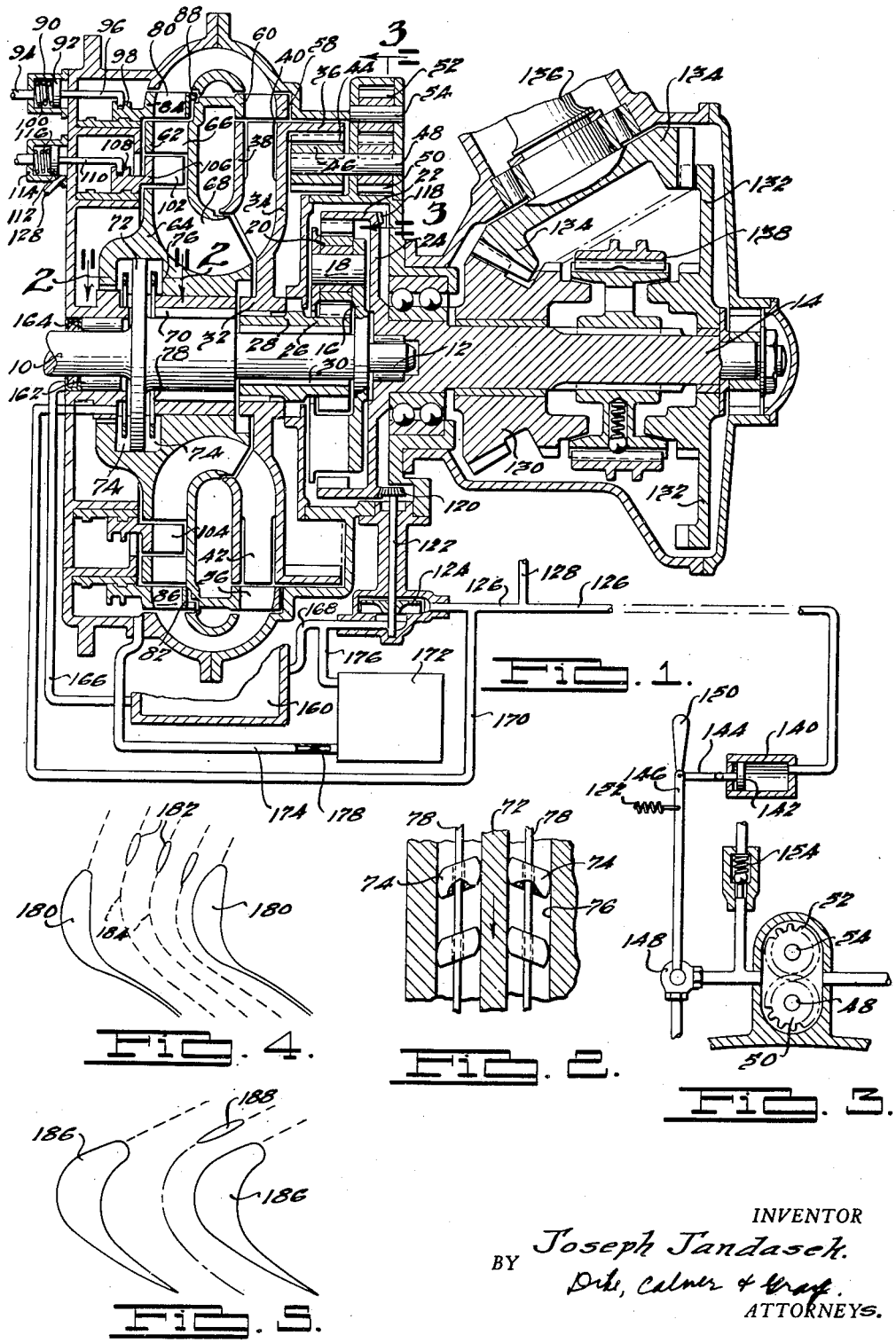
INVENTOR
Joseph Jandasek.
BY
ATTORNEYS.

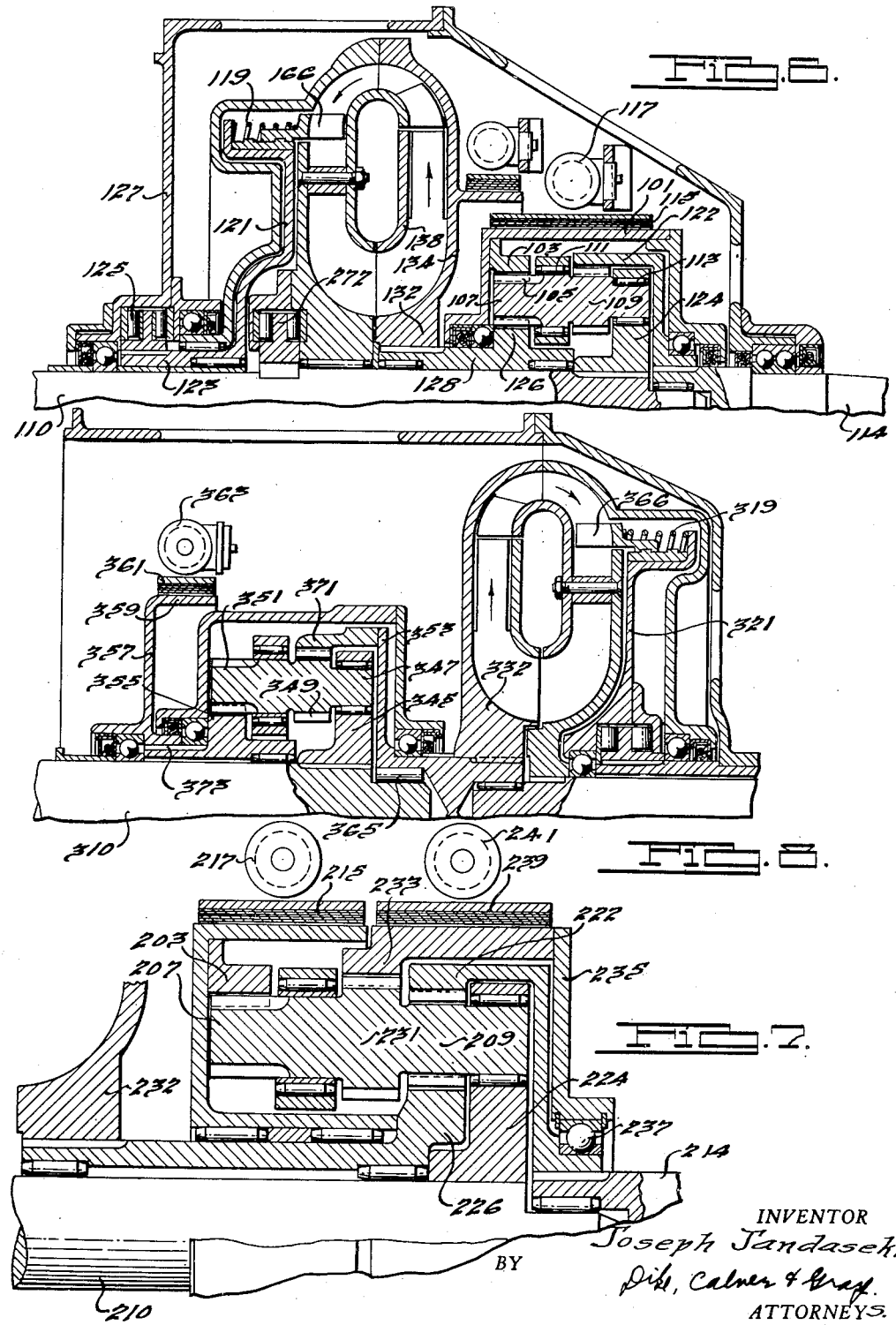

Patented Nov. 2, 1943

2,333,253

UNITED STATES PATENT OFFICE 2,333,253

TURBOTRANSMISSION

Joseph Jandasek, Detroit, Mich., assignor to Bendix Aviation Corporation, South Bend, Ind., a corporation of Delaware Application February 7, 1940, Serial No. 317,637

21 Claims. (Cl. 74—189.5)

This invention relates to transmissions and more particularly to transmissions of the turbo torque converter type wherein means are employed to lock the impeller against rotation and to transmit power at varying speed ratios and in reverse.

An object of this invention is to provide an improved turbo torque converter having mechanical gear means which may be rendered operative by locking the turbo impeller thereby rendering the torque converter unit inoperative.

A further object of the invention is to provide fluid pressure operated means for rendering a turbo torque converter inoperative by locking the impeller against rotation whereby power may be transmitted mechanically.

Another object resides in the provision of fluid pressure operated means controlled by fluid pressure developed in the fluid transmission and influenced by engine throttle position to lock the impeller of the turbounit against rotation thereby rendering the fluid transmission inoperative to transmit power through a mechanical gear train associated with the turbounit.

Yet a still further object of the invention is to provide a turbotransmission unit having a plurality of spaced axially movable guide wheels wherein fluid pressure responsive means controlled by fluid pressure developed within the transmission and variations of fluid pressure developed by engine operating conditions are employed to selectively influence the movement of the axially shiftable guide wheels whereby the unit may selectively operate as a turboclutch, as a torque converter to transmit power at low speed or as a torque converter to transmit power at a higher speed.

Another object of the invention is to provide a turbo and mechanical torque converter unit operating on the regenerative principle whereby a portion of the power imparted by the driving shaft is transmitted to a driven shaft through mechanical gearing and a portion of the power is redirected from the turbine of the torque converter unit to the driving shaft through a novel radially disposed one-way clutch interposed between the turbine unit and the driving shaft to increase the power exerted by the driving shaft.

A further object is to provide a combined turbo and mechanical transmission wherein means are provided to lock one portion of the mechanical unit to transmit power from the driving shaft to the driven shaft in reverse.

Yet a still further object resides in the provision of a combined turbo and mechanical unit wherein means are provided to selectively lock spaced elements of the mechanical unit to transmit power from the driving shaft to the driven shaft in low speed or reverse.

Another object is to provide a novel drive mechanism for a turbo torque converter wherein means are provided to drive the impeller at substantially the same speed as the driving shaft or at an increased or decreased speed.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Figure 1 is a vertical section of a torque converter embodying the present invention;

Figure 2 is a sectional view taken substantially on the line 2—2 of Figure 1;

Figure 3 is a sectional view taken substantially on the line 3—3 of Figure 1;

Figures 4 and 5 are diagrammatic views illustrating desirable forms of main and rectifying vanes;

Figure 6 is a vertical section similar in many respects to Figure 1 showing a modified form of my invention;

Figure 7 is a vertical section of a modified form of the invention similar in many respects to a portion of Figure 6; and Figure 8 is a vertical section of a still further modified form of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to Figure 1, it will be observed that a driving shaft 10 projects through the turbounit and may be journalled as at 12 in any desired member such for example as in the end of a driven shaft 14. The inner end of the driving shaft 10 is provided with a radially extending flange 16 which has a plurality of radially spaced stub shafts 18 having pinions 20 mounted thereon. The pinions 20 are positioned to engage a ring gear 22 carried by a flange 24 fixed to the driven shaft 14.

The pinions 20 engage a sun gear 26 fixed to a sleeve 28. The sleeve 28 is preferably rotatably mounted on the driving shaft 10 by means of suitable bearings 30, and is fixed to an impeller hub 32 in any desired manner as by a splined keyway. The impeller hub 32 supports an impeller web 34 having an axially extending flange 36 fixed thereto and also carries an impeller shroud 38. The impeller web 34 and shroud 38 cooperate to form a fluid passage 40 therebetween. A plurality of spaced fluid directing blades 42 are interposed in the channel 40.

The flange 36 is provided with internal gear teeth 44 in mesh with a pinion gear 46 mounted on a shaft 48 for driving a pump. The pump includes a pinion 50 mounted on the shaft 48 and in mesh with a second pinion 52 mounted on a shaft 54 as more clearly illustrated in Figure 3.

Upon rotation of the impeller, fluid is directed outwardly in the channel 40 by centrifugal force to a first stage turbine channel 56 interposed between a turbine shroud 58 and a turbine web 60.

It will be observed that the turbine shroud 60 is provided with a second stage turbine web 62 and a third stage turbine web 64. The second stage turbine is provided with spaced vanes 66 and the third stage turbine is provided with spaced vanes 68.

The turbine web 64 is rotatably mounted on the driving shaft 10 by means of suitable bearings 70. The driving shaft 10 is provided with a radially extending flange 72, see also Figure 2, interposed between one-way driving means 74 which engage radially extending side walls 76 carried by the turbine web 64. The one-way driving means 74 is mounted on a flexible member 78 in such a manner as to transmit power from the turbine web 64 to the driving shaft 10 when the turbine tends to rotate at a higher speed than the driving shaft 10.

Interposed between the first and second stage turbines is a first stage axially movable guide wheel 80 having spaced shroud and web members 82 and 84 respectively. Suitable fluid directing vanes 86 are positioned in the guide wheel 80. A plurality of spaced auxiliary vanes 88 are carried by the guide wheel shroud member 82 to assist in moving the guide wheel axially into the fluid channel under certain operating conditions.

Suitable fluid pressure operated means such for example as a cylinder 90 and a piston 92 subjected to manifold vacuum through a conduit 94 are employed to assist in withdrawing the guide wheel from the fluid channel under certain operating conditions. The piston 92 is operably connected to the guide wheel 80 by means of a rod 96 engaging in a slot carried by a web 98 fixed to the shroud 84. A spring 100 interposed in the cylinder 90 yieldingly urges the piston 92 inwardly to counteract the force of the variation in pressure exerted on the piston until the variation of fluid pressure in the manifold or elsewhere reaches a substantially predetermined value.

A second stage guide wheel 102 having a plurality of suitable vanes 104 is interposed between the second and third stage turbine wheels 66 and 68. The second stage guide wheel is provided with a web 106 having an axially extending web 108 which may be engaged by a rod 110 to move the second stage guide wheel axially into and out of the fluid circuit under certain operating conditions. The rod 110 is provided with a piston 112 slidably mounted in a cylinder 114. Any desired fluid pressure means may be provided to subject the space within the cylinder 114 to variations in fluid pressure, a spring 116 being provided to oppose the force exerted on the piston 112.

Fluid pressure employed to operate the second stage guide wheel is preferably proportionate to the speed of the driven shaft 14. A beveled gear 118 carried by the ring gear 22 may be provided to drive a beveled pinion 120 fixed to a shaft 122 which drives a centrifugal pump 124 to supply fluid under pressure to a conduit 126 which communicates by way of a conduit 128 with the cylinder 114 to urge the piston 112 and the guide wheel shroud 106 outwardly when the turbounit is operating to build up fluid pressure of a substantially predetermined value.

The driven shaft 14 is provided with spaced freely rotatable beveled gears 130 and 132 in mesh with a beveled gear 134 carried by a final driven shaft 136. A synchronizing unit 138 may be provided to interconnect the driven shaft 14 and the final driven shaft 136 by way of the beveled gears 130 and 134 to effect forward drive, or to interconnect the driven shaft 14 and the final driven shaft 136 by way of the beveled gears 132 and 134 to effect reverse drive.

Referring now to Figure 3, it will be observed that the fluid pressure developed by the pump 124 is transmitted through the conduit 126 to a cylinder 140 having a piston 142 slidably mounted therein. The piston 142 is suitably connected through linkage 144 to a lever 146 which actuates a control valve 148 to control the gear pump formed by the gears 50 and 52 driven by the impeller web 36. The lever 146 is provided with a handle 150 under the control of the operator, and is also flexibly connected to the throttle lever by means of a linkage including a spring 152 whereby the position of the lever 146 is influenced in accordance with throttle position. When the unit is operating at high speed the pump 124 delivers fluid under high pressure into the cylinder 140 and the piston 142 urges the lever 146 to close the valve 148 thereby stopping the pump to substantially lock the impeller against rotation. Power is then transmitted from the driving shaft 10 to the driven shaft 14 through the overdrive gears. When the engine is operating at substantially closed throttle position, the linkage including the spring 152 exerts a force on the lever 146 to urge the valve 148 in the opening direction. A check valve 154 may be interposed between the valve 148 and the pump formed by the gears 50 and 52 to relieve excess pressure thereby preventing the possibility of damaging the device.

A sump 160 is provided to receive fluid which leaks past bearings 162 and an oil seal 164 by way of a conduit 166. A conduit 168 interposed between the sump 160 and the pump 124 is provided to withdraw fluid from the sump and redirect it to the fluid channel by means of a conduit 170 as illustrated.

A radiator or cooler 172 may be provided to receive fluid from the fluid passageway by means of a conduit 174. A conduit 176 interposed between the cooler 172 and the pump 124 is provided to permit fluid to be withdrawn from the cooler for recirculation to the fluid circuit. Suitable throttling means such for example as a venturi 178 may be positioned in the conduit 174 which communicates with the radiator 172.

Referring now to Figure 4, it will be observed that suitable main vanes 180 of a type which may be carried by a turbine or guide wheel unit are illustrated. Interposed between the main vanes 180 are a plurality of rectifying vanes 182 so positioned that their leading edges lie in a plane perpendicular to the streamlines 184 indicating the direction of fluid flow. The vanes 182 are spaced in such a manner that the volume of fluid passing between any of the vanes 182 on the streamlines 184 is substantially uniform.

Figure 5 shows main vanes 186 and a rectifying vane 188 proportioned and disposed at different angles than the vanes illustrated in Figure 4. These vanes operate in a manner substantially similar to those illustrated in Figure 4.

In the operation of the device thus far described, power is transmitted from the driving shaft 10 through the flange 16 to the pinions 20 carried by the stub shafts 18. When the device is operating as a torque converter the pinions 20 rotate between the sun gear 26 and the ring gear 22 to drive the driven shaft 14 at varying speeds dependent on the torque transmitted. Rotation of the sun gear 26 operates through the hub 32 and web 34 to rotate the impeller thereby energizing fluid and directing it outwardly by centrifugal force to the first stage turbine 56.

After passing through the first stage turbine 56 the fluid is directed to the first stage guide wheel 80, then to the second stage turbine 66, then to the second stage guide wheel 102, and then to the third stage turbine 68. The fluid flows from the third stage turbine 68 back into the impeller channel 40 whereupon the cycle of operation will be repeated.

The turbine web 64 is operably connected by way of the one-way driving means 74 to transmit power from the turbine to the flange 72 carried by the driving shaft 10. A regenerative power transmitting device is thus provided whereby a portion of the power is transmitted directly to the driven shaft 14 through the planetary gear mechanism and a portion of the power is regenerated through the turbounit to exert a force on the driving shaft 10.

When it is desired to operate the device as a torque converter to transmit power at high torque multiplication, both of the guide wheels 80 and 102 should be positioned in the fluid circuit. When it is desired to transmit power at light torque multiplication, one of the guide wheels 80 or 102 will be withdrawn from the fluid circuit whereupon power will be transmitted at a lesser degree of torque multiplication. When it is desired to transmit power at a substantially 1:1 ratio with no torque multiplication, both of the guide wheels 80 and 102 may be withdrawn from the fluid circuit whereupon the impeller and turbine elements rotate at substantially the same speed to transmit power. It will be observed that when the guide wheel 80 is withdrawn from the fluid circuit, the vanes 88 carried by the guide wheel shroud 82 project slightly into the fluid circuit whereupon fluid reaction may be exerted against them to assist in moving the guide wheel back into the fluid circuit when the fluid reaction within the circuit approaches substantially predetermined operating pressures.

It will be apparent that when the device is operating as a torque converter the impeller web 34 rotates at a higher rate of speed than the driving shaft 10 due to the resistance encountered in rotating the driven shaft 14.

When the device is operating as a turboclutch the ring gear 22 and sun gear 26 and impeller web 34 rotate at approximately the same speed to transmit power to the driven shaft 14 with no torque multiplication.

When it is desired to transmit power at over drive the fluid pump 50, 52 driven by the gear 46 meshing with the gear 44 of the flange 36 carried by the impeller web 34, may be rendered inoperative by means of the valve 148. The valve 148 may be actuated automatically under the influence of the torque responsive means influenced by spring 152 or by speed responsive means under the influence of fluid pressure developed by the pump 124 or by manually operable means under the influence of handle 150. When the pump 50, 52 is thus rendered inoperative, the shaft 48, gear 46 and flange 36 carried by the web 34 are locked against rotation thereby rendering the turbounit inoperative and locking the sun gear 26 whereupon power is transmitted from the driving shaft 10 through the planetary gearing to the ring gear 22 carried by the driven shaft 14 to drive the driven shaft at a higher speed. When the device is operating at over drive and the turbounit is rendered inoperative, the one-way driving means 74 permit the turbine to remain stationary.

Referring now to Figure 6, it will be observed that many of the elements are substantially similar to certain elements of Figure 1. Corresponding parts have therefore been given corresponding reference numerals with the addition of 100.

A housing 101 is rotatably mounted on the driven shaft 114 and on the impeller sleeve 128. A reverse gear 103 fixed to the housing 101 is provided with internal teeth 105 which mesh with bracket pinion 107. The bracket pinion 107 is integral with a spaced bracket pinion 109 of different diameter which meshes with the internal gear teeth of the ring gear 122. The pinions 107 and 109 are suitably mounted on bearings 111 and 113 associated with the flange 124.

Any suitable means may be provided to stop the housing 101 from rotating. One desirable form includes a brake drum mechanism 115 which may be actuated in any desired manner as by means of a hydraulic unit 117 to effect reverse drive. When the housing 101 is held from rotation, the reverse gear 103 fixed thereto is stationary whereupon the bracket pinion 107 rolls within the reverse gear 103 and the pinion 109 drives the ring gear 122 and the driven shaft 114 in reverse direction because of the variation in diameter between the pinions 107 and 109.

It will be observed that in this embodiment of the invention the housing containing the impeller turbine and guide wheels is rotatably mounted, and a guide wheel 166 is yieldingly urged by means of a spring 119 into the fluid circuit. The guide wheel 166 may be urged out of the fluid circuit by the force of fluid reaction acting thereon.

It will be observed that the guide wheel 166 is carried by a radially extending flange 121 supported by a sleeve 123 rotatably mounted on the driving shaft 110. One-way braking means 125 having spaced wedging means adapted to produce a wedging action against axially spaced surfaces to effect a braking action in one direction and to permit free rotation in the other direction of rotation, may be employed to interconnect the guide wheel 166 with the stationary housing member 127.

When the device is operating as a torque converter or as a turboclutch, a portion of the power is transmitted from the driving shaft 110 through the flange 124, pinion 109 and ring gear 122 to the driven shaft 114. The remainder of the power is transmitted through the pinion 107, sun gear 126, sleeve 128 to the impeller hub 132 and impeller web 134. Rotation of the impeller energizes fluid to transmit power to the turbine which in turn transmits the power back to the driving shaft 110 by means of the one-way driving means 272.

When it is desired to render the turbounit inoperative and transmit power from the driving shaft 110 to the driven shaft 114 in over drive, the turbounit may be rendered inoperative by locking the impeller web 134 by means of any suitable braking mechanism such as the hydraulic unit illustrated in connection with the flange carried by the impeller web.

When it is desired to transmit power from the driving shaft 110 to the driven shaft 114 in reverse the brake mechanism 117 may be actuated to lock the housing 101 whereupon the reverse gear 103 is locked and the pinions 107 and 109 roll within the ring gear 103 to transmit power to the ring gear 122 in reverse direction because of the variation in diameter of the pinions 109 and 107.

Referring now to Figure 7, it will be observed that many of the elements illustrated are substantially similar to certain elements of Figure 6, and that corresponding parts have therefore been given corresponding reference numerals with the addition of 100.

It will be observed that an auxiliary pinion gear 231 is interposed between the pinion gears 207 and 209, and is of different diameter than said pinions. The pinion gear 231 engages a ring gear 233 carried by a radially extending flange 235 rotatably mounted on the ring gear 222 by means of suitable bearings 237. Means, such for example as the brake mechanism 239 actuated by a hydraulic unit 241 are provided to lock the ring gear 233 from rotation whereupon the pinion 231 rotates within the ring gear 233 to drive the ring gear 222 at low speed.

The operation of the device illustrated in Fig. 7 is similar to that of Fig. 6 with the exception that an auxiliary low speed gear is provided when it is desired to transmit power from the driving shaft 110 to the driven shaft 114 at high torque multiplication. When the unit is operating in this manner the brake mechanism 241 is actuated to lock the ring gear 233 by means of the brake band 239 whereupon power is transmitted from the driving shaft 210 through the flange 224, pinion 209, ring gear 222 by reason of the fact that the pinion gears 231 rotate within the ring gear 233 to transmit power to the driven shaft 214 at high torque multiplication.

Referring now to Figure 8, it will be observed that a further modified form of the invention is disclosed wherein speed varying means are interposed between the driving shaft 310 and the turbounit. The driving shaft 310 is provided with a flange 345 suitably secured thereto as by splines. The flange 345 is provided with a plurality of spaced shafts 347 having spaced pinions 349 and 351 of different diameters. The pinion 349 meshes with a ring gear 371 carried by a flange 353 fixed to the impeller hub 332. The pinion 351 meshes with a sun gear 355 rotatably mounted on the driving shaft 310. The sun gear 355 is suitably secured to a flange 357 by means of splines 373. The flange 357 has an axially extending flange 359 which may be engaged by a brake band 361 actuated by a hydraulic unit 363 to hold the flange 357 and the sun gear 355 stationary.

When the brake unit 363 is operated to hold the flange 359 and the sun gear 355 fixed, the drive goes from the driving shaft 310 through the flange 345, pinion 349, ring gear 371, flange 353 to actuate the impeller 332 at higher speed.

When the brake unit 363 is inoperative whereupon the flange 359 and the sun gear 355 are released to rotate, the drive goes from the driving shaft 310 through a one-way clutch 365 to rotate the impeller 332 at the same speed as the driving shaft 310. If desired, speed reducing means may be employed to drive the impeller 332 at a slower speed than that of the driving shaft 310.

In the operation of the device illustrated in Fig. 8, when it is desired to transmit power from the driving shaft 310 to the impeller 332 at substantially the same speed, the hydraulic unit 363 is actuated to release the flange 359 whereupon power is transmitted from the driving shaft 310 to the impeller 332 through the one-way driving means 365.

When it is desired to drive the impeller 332 at a speed other than that of the driving shaft 310, such for example as at over drive, the hydraulic unit 363 may be actuated to engage and hold the flange 359 to hold the sun gear 373 against rotation. Power is then transmitted from the driving shaft 310 through the flange 345, pinions 349 to rotate the ring gear 371, and the impeller 332 at a desired speed ratio.

It will be understood that in all of the units illustrated, the guide wheel elements may be withdrawn whereupon the units operate as turboclutches rather than as torque converters.

It is to be clearly understood that various elements illustrated in one figure of these drawings may be replaced by other elements disclosed in other of the figures without departing from the spirit of my invention.

This is a continuation-in-part of my co-pending applications, Serial No. 588,163, now Patent No. 2,222,618, and Serial No. 547,256, filed June 27, 1931, now Patent No. 2,271,919.

Features disclosed but not claimed herein are being claimed in my co-pending application, Serial No. 492,809, filed June 30, 1943.

I claim:

1. In a turbotransmission, a fluid circuit, a quantity of fluid circulating in the circuit to transmit energy, a guide wheel extending into the circuit, and fluid pressure responsive means controlled by the speed of the transmission and fluid reaction responsive means to influence the position of the guide wheel in the circuit.

2. In a turbounit, impeller and turbine elements comprising a fluid circuit to transmit energy, fluid pressure actuated movable guide wheel means associated with the impeller and turbine elements and movable into and out of the fluid circuit, means carried by the guide wheel means and projecting into the fluid circuit whereby the fluid circulating in the circuit may urge the guide wheel means into the circuit when it is out of said circuit.

3. In a turbounit for a motor vehicle having an engine including a source of variable fluid pressure, impeller and turbine elements comprising a fluid circuit to transmit energy, guide wheel means associated with the impeller and turbine elements, means influenced by fluid reaction in said circuit to shift the guide wheel means into and out of the fluid circuit, pressure responsive means controlled by said source of variable fluid pressure to shift the guide wheel means in accordance with variations in pressure in said source of variable fluid pressure.

4. In a turbounit for a motor vehicle having an engine including an intake manifold, impeller and turbine elements comprising a fluid circuit to transmit energy, guide wheel means associated with the impeller and turbine elements, means to shift the guide wheel means into and out of the fluid circuit, pressure responsive means controlled by variations of pressure in said manifold and means controlled by fluid reaction in the fluid circuit to shift the guide wheel means in accordance with variations in pressure in the manifold.

5. In a transmission, a driving shaft, a driven shaft, a turbounit comprising impeller and turbine elements, planetary gearing interposed between the driving and driven shafts, means including a pump driven by the impeller to develop fluid pressure in proportion to speed of rotation of the impeller, and means associated with said pump to lock the impeller against rotation to render the turbounit inoperative.

6. In a transmission, a driving shaft, a driven shaft, a turbounit comprising impeller and turbine elements, planetary gearing interposed between the driving and driven shafts, means including a pump driven by the impeller to develop fluid pressure in proportion to speed of rotation of the impeller, means associated with said pump to lock the impeller against rotation to render the turbounit inoperative, and means comprising a fluid pump driven by the driven shaft to render said first named pump inoperative when the driven shaft approaches a substantially predetermined speed.

7. In a transmission, driving and driven shafts, planetary gearing interconnecting the driving and driven shafts, regenerative turbo-means associated with the planetary gearing and driving shaft, a fluid pump associated with the driven shaft to develop fluid pressure proportionate to the speed of rotation of the driven shaft, and fluid pressure operated means controlled by the speed of the driven shaft to interrupt the operation of said turbounit when the driven shaft approaches a substantially predetermined speed.

8. In a transmission, driving and driven shafts, planetary gearing including an overdrive speed gear interconnecting the driving and driven shafts, regenerative turbo-means driven by the planetary gearing to transmit energy to the driving shaft, a fluid pump driven by the driven shaft to develop fluid pressure proportionate to the speed of rotation of the driven shaft, and means comprising a pump driven by the impeller and control means responsive to variations of fluid pressure developed by the pump driven by the driven shaft to render the turbounit inoperative by locking the impeller driven pump when the driven shaft approaches a substantially predetermined speed to transmit power through the planetary gearing at an overdrive speed.

9. In a transmission for a throttle controlled engine, a driving shaft, a driven shaft, connecting means between the driving and driven shafts including a planetary gear train, a regenerative turbounit comprising rotatable impeller and turbine elements operably connected to the planetary gear train and driving shaft respectively, one-way driving means between the turbine and driving shaft, fluid pressure inducing means operated by the driven shaft to develop fluid pressure proportionate to the speed of the driven shaft, means associated with the impeller and operated by fluid pressure developed by said pressure inducing means to render the turbounit inoperative when the driven shaft approaches a substantially predetermined speed of rotation, and means controlled by throttle position to influence the operation of the turbounit.

10. In a transmission for a throttle controlled engine, a driving shaft, a driven shaft, connecting means between the driving and driven shafts including a planetary gear train having an overdrive speed ratio, a regenerative turbounit comprising rotatable impeller and turbine elements associated with the planetary gear train and driving shaft, fluid pressure inducing means operated by the driven shaft, means to develop fluid pressure proportionate to the speed of the driven shaft, control means associated with the turbounit and operated by fluid pressure developed by rotation of the driven shaft to render the turbounit inoperative when the driven shaft approaches a substantially predetermined speed, and auxiliary means controlled by throttle position to influence the operation of the turbounit to render the turbounit inoperative to transmit power from the driving shaft to the driven shaft at overdrive speed.

11. In a turbotransmission, a driving shaft, a driven shaft, planetary gearing associated with the driving and driven shafts, a regenerative turbounit comprising an impeller driven by the planetary gearing at a speed different than that of the driving shaft, a turbine element, a radially extending flange carried by the driving shaft, and connecting means between the turbine element and driving shaft comprising one-way driving means associated with a turbine element and engaging said flange to transmit power to the driving shaft when the turbine element tends to overrun the speed of the driving shaft.

12. In a turbotransmission comprising rotatable members having a plurality of main vanes and a plurality of auxiliary rectifying vanes interposed between the main vanes in such a manner that the leading edges of the rectifying vanes lie on a line substantially perpendicular to the streamlines of fluid flow between the main vanes and at an angle to the leading edges of the main vanes, the spaces between the auxiliary vanes being such that substantially equal quantities of fluid pass between each of the auxiliary vanes.

13. In a turbo torque converter, a driving shaft, an impeller, driving means comprising brake controlled planetary gearing and one-way driving means interposed between the driving shaft and impeller, and means to operate the brake means to selectively render the planetary gearing operative or inoperative to drive the impeller at a speed different from the speed of the driving shaft or to drive the impeller through the one-way driving means at substantially the same speed as that of the driving shaft.

14. In a transmission, a driving shaft, a driven shaft, planetary gearing including brake controlled speed varying means interposed between the driving and driven shafts, regenerative turbo torque converter driving means associated with the planetary gearing, means to actuate said brake controlled speed varying means, and brake controlled means to render said regenerative turbo torque converter driving means inoperative.

15. In a transmission, a driving shaft, an impeller, a turbine cooperating with the impeller to form a power transmitting fluid circuit, speed varying means including planetary gearing interposed between the driving shaft and impeller, brake operated means to control operation of said speed varying means to drive the impeller at speed different from that of the driving shaft, and one-way driving means between the turbine and driving shaft.

16. In a transmission, a driving shaft having a radially extending flange, a driven shaft, planetary gear means interposed between the driving and driven shafts, a regenerative turbodrive comprising an impeller operably connected to the planetary gearing to energize a fluid, a turbine having a flanged member including substantially parallel side walls spaced from the flange on the driving shaft, and one-way driving means between the turbine and the flange carried by the driving shaft.

17. In a transmission, a driving shaft, a driven shaft, planetary gearing comprising a sun gear carried by the driving shaft, a plurality of axially spaced ring gears, connecting means between one of the ring gears and the driven shaft, connecting means comprising axially extending pinion gears of different diameters interposed between the sun gear and the ring gears, brake means to lock one of the ring gears and its associated connecting means to transmit power from the driving shaft to the driven shaft at variable speeds, and a turbounit including a rotatable impeller operably connected to the sun gear and a turbine associated with the driving shaft.

18. A turbotransmission comprising a fluid energizing driving member, an energy absorbing driven member, movable means associated with the driving and driven members to operate the transmission as a torque converter or as a turboclutch, and control means influenced jointly by the torque of the driving member the speed of the driven member and fluid reaction for controlling the position of said movable member.

19. A transmission comprising driving and driven members, impeller and turbine wheels associated with the driving and driven members and cooperating to form a fluid circuit, a guide wheel, means to shift the guide wheel into or out of the fluid circuit to operate the transmission as a torque converter or as a turboclutch, and means influenced jointly by the speed of the driven member and by fluid reaction in the fluid circuit for shifting the guide wheel into or out of the fluid circuit to selectively operate the transmission as a torque converter or as a turboclutch.

20. A transmission comprising a driving shaft, a driven shaft, planetary gearing including brake controlled speed varying means interposed between the driving and driven shafts, turbo torque converter driving means interposed between the planetary gearing and driving shaft, means to actuate said brake controlled speed varying means, and brake controlled means to render inoperative said turbo torque converter.

21. A transmission comprising a power input shaft, a gear system connected thereto including means for dividing the power into distinct paths, a power output shaft connected to one of the paths, a fluid drive connecting the other path to the input shaft, means to hold the fluid drive from rotating, and means for changing direction of rotation of the gear system.

JOSEPH JANDASEK.